US010694033B2

(12) United States Patent
Quilici et al.

(10) Patent No.: US 10,694,033 B2
(45) Date of Patent: *Jun. 23, 2020

(54) SYSTEM AND METHOD FOR IDENTIFYING UNWANTED COMMUNICATIONS USING COMMUNICATION FINGERPRINTING

(71) Applicant: YouMail, Inc., Irvine, CA (US)

(72) Inventors: Alexander E Quilici, Malibu, CA (US); Michael J. Rudolph, San Juan Capistrano, CA (US); Justin Malvin, Burbank, CA (US); Jeffrey Verdegan, Costa Mesa, CA (US); Dylan Gise, Long Beach, CA (US)

(73) Assignee: YouMail, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,514

(22) Filed: Jul. 12, 2018

(65) Prior Publication Data

US 2019/0037073 A1 Jan. 31, 2019

Related U.S. Application Data

(63) Continuation of application No. 15/706,818, filed on Sep. 18, 2017, now Pat. No. 10,051,121, which is a
(Continued)

(51) Int. Cl.
*H04M 1/56* (2006.01)
*H04M 15/06* (2006.01)
(Continued)

(52) U.S. Cl.
CPC ....... *H04M 3/436* (2013.01); *H04M 3/42068* (2013.01); *H04M 3/42153* (2013.01);
(Continued)

(58) Field of Classification Search
None
See application file for complete search history.

(56) References Cited

U.S. PATENT DOCUMENTS 10,051,121 B2 * 8/2018 Quilici ............. H04M 3/42153
2003/0169857 A1 * 9/2003 Akhteruzzaman .... H04M 3/382
379/88.01
(Continued)

OTHER PUBLICATIONS

Patent Cooperation Treaty International Search Report, dated Oct. 30, 2018, ISA/US.

*Primary Examiner* — Quoc D Tran
(74) *Attorney, Agent, or Firm* — Meister Seelig & Fein LLP; Seth H. Ostrow, Esq.

(57) ABSTRACT

A method for identifying communicators as wanted or unwanted based on messages from such communicators comprising receiving, by the data processing system, an inbound message from a communicator, comparing, by the data processing system, the inbound message to fingerprints stored in a database accessible to the data processing system, determining, by the data processing system, at least one match to the fingerprints, determining, by the data processing system, an identity of the communicator by determining whether and how likely the communicator is wanted or unwanted based on the at least one match to the fingerprints, and configuring, by the data processing system, handling of calls from the communicator based on the identity.

20 Claims, 5 Drawing Sheets

Related U.S. Application Data continuation-in-part of application No. 15/412,182, filed on Jan. 23, 2017, now Pat. No. 10,110,739, which is a continuation of application No. 15/133,442, filed on Apr. 20, 2016, now Pat. No. 9,591,131.

(60) Provisional application No. 62/150,244, filed on Apr. 20, 2015.

(51) Int. Cl.
*H04M 1/64* (2006.01)
*H04M 3/436* (2006.01)
*H04M 3/42* (2006.01)
*H04M 15/00* (2006.01)
*H04W 4/24* (2018.01)

(52) U.S. Cl.
CPC ........... *H04M 15/06* (2013.01); *H04M 15/41* (2013.01); *H04W 4/24* (2013.01); *H04M 3/42059* (2013.01); *H04M 2201/18* (2013.01); *H04M 2203/6054* (2013.01); *H04M 2215/0164* (2013.01); *H04M 2250/60* (2013.01)

(56) References Cited

U.S. PATENT DOCUMENTS

| | | | |
|---|---|---|---|
| 2003/0220784 A1* | 11/2003 | Fellenstein | H04M 3/533 704/201 |
| 2008/0084975 A1* | 4/2008 | Schwartz | H04M 3/436 379/88.22 |
| 2009/0147930 A1 | 6/2009 | Rice | |
| 2010/0246960 A1* | 9/2010 | Kim | G06K 9/00577 382/176 |
| 2015/0095028 A1 | 4/2015 | Karpey et al. | |
| 2015/0295869 A1* | 10/2015 | Li | H04L 51/12 709/206 |

\* cited by examiner

SYSTEM AND METHOD FOR IDENTIFYING UNWANTED COMMUNICATIONS USING COMMUNICATION FINGERPRINTING

CROSS REFERENCE TO RELATED APPLICATION

The present application is a continuation-in-part and claims the benefit of U.S. patent application Ser. No. 15/412,182 titled "SYSTEM AND METHOD FOR IDENTIFYING AND HANDLING UNWANTED CALLERS USING A CALL ANSWERING SYSTEM" filed Jan. 23, 2017, now pending, which is a continuation and claims the benefit of U.S. Pat. No. 9,591,131 titled "SYSTEM AND METHOD FOR IDENTIFYING UNWANTED CALLERS AND REJECTING OR OTHERWISE DISPOSING OF CALLS FROM SAME" filed Apr. 20, 2016, which claims the benefit of U.S. provisional application No. 62/150,244 titled "SYSTEM AND METHOD FOR IDENTIFYING UNWANTED CALLERS AND REJECTING OR OTHERWISE DISPOSING OF CALLS FROM SAME" filed Apr. 20, 2015, the disclosures of which are hereby incorporated by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The invention described herein generally relates to Internet-enabled telephone devices, software and operating systems—both wireless and landline—capable of determining and blocking calls from unwanted communicators.

Description of the Related Art

Telephone users may receive calls from callers such users generally and collectively agree are unwanted—typically because the caller is unsolicited, such as a telemarketer who is sequentially or randomly calling upon the audience and is not one of such users' typical known callers with which such users' have a pre-existing relationship. This is particularly true in mobile communication systems where mobile telephone users will often be interrupted at any time by unwanted calls. In addition, unsolicited messages may be left in voice mail systems of users who configure their landline and wireless telephone devices to forward their unanswered calls to such voice mail systems to answer their unanswered phone calls. Voice mail left by unwanted callers is an especially expensive problem for users who must retrieve messages from the voice mail system via cell phones, long distance calls, or transcriptions. Voice mail left by unwanted callers causes users to spend real dollars (air time, per minute charges, toll free charges to enterprise, voicemail transcription, etc.) and waste precious time on messages to which they do not want to listen.

Current solutions for identifying unwanted solicitors rely on a predetermined list of unwanted solicitors. For example, caller identification (ID) systems allow recipients to screen the source of incoming calls, but many callers can either "spoof" a fake number to avoid recognition or block their Caller ID information entirely so that no information is provided to a recipient about the caller. Call-blocking features allow recipients to block callers from specific phone numbers and those that intentionally block their calling information. Government telemarketing restriction lists allow recipients who take certain specific steps to be listed as people who do not wish to be called by telemarketers, but such lists are not fully effective to avoid unwanted telephone calls.

The above solutions do not adequately provide full protection from unwanted phone calls. Accordingly, additional technology is still needed in order to enable effective call blocking.

SUMMARY OF THE INVENTION

The present invention provides methods in a data processing system comprising a processor and a memory. According to one embodiment, a method for identifying communicators as wanted or unwanted based on messages from such communicators comprises receiving, by the data processing system, an inbound message from a communicator. The inbound message is compared to fingerprints stored in a database that is accessible to the data processing system. The method further comprises determining, by the data processing system, at least one match to the fingerprints, determining, by the data processing system, an identity of the communicator by determining whether and how likely the communicator is wanted or unwanted based on at least one match to the fingerprints, and configuring, by the data processing system, handling of calls from the communicator based on the identity.

The inbound message may include a voice message. In another embodiment, the method may further comprise transcribing, by the data processing system, the voice message into text. The method may also comprise transcribing, by the data processing system, the voice message into a tag cloud. Additionally, the method may further comprise comparing, by the data processing system, the inbound message to the fingerprints, and identifying, by the data processing system, that the inbound message matches fingerprints of at least one known unwanted communicator. According to yet another embodiment, the method may further comprise creating, by the data processing system, a database of the fingerprints from known recordings of calls or messages from unwanted or wanted communicators. The fingerprints may comprise features associated with messages from phone numbers associated with unwanted communicators, the features selected from the group consisting of: phone number, message duration, call frequency, time of call, call recipients, keywords, phrases, speech tone, and speech frequency range. Alternatively, the fingerprints may comprise sequences of characters that are representative of content of known voice messages. The fingerprints may also comprise tag clouds that include keywords that appear in known messages and a number of times the keywords appear in the known messages. The fingerprints can also be associated with tags indicative of problematic communicators. In certain embodiments, determining at least one match to the fingerprints further comprises determining, by the data processing system, an amount of overlap between a given fingerprint and the inbound voice message, and calculating, by the data processing system, a score based on the determined amount of overlap. In other embodiments, determining the match can include calculating, by the data processing system, a score based on differences between a given fingerprint and the inbound voice message. Configuring the handling of calls may further comprise blocking further communications from the communicator.

According to another embodiment, a method for identifying communicators as wanted or unwanted based on calls from such communicators comprises deploying, by the data processing system, a bot to answer an inbound call from a communicator. The inbound call between the bot and the communicator is recorded by the data processing system where the recording of the inbound call includes an interaction between the bot and the communicator. The method further comprises transcribing, by the data processing system, the recording of the inbound call, generating, by the data processing system, a voice message from the transcription of the recording of the inbound call, comparing, by the data processing system, the voice message to fingerprints stored in a database that is accessible to the data processing system, determining, by the data processing system, at least one match to the fingerprints, determining, by the data processing system, an identity of the communicator as wanted or unwanted based on the at least one match to the fingerprints, and configuring, by the data processing system, handling of calls from the communicator based on the identity.

The method may further comprise deploying, by the data processing system, the bot to answer inbound calls from a given set of phone numbers associated with known unwanted communicators. In another embodiment, the method further comprises configuring, by the data processing system, the bot to play a sequence of responses in the interaction between the bot and the communicator. The method may also comprise screening future inbound calls based on the configuration. Additionally, the method may further comprise removing, by the data processing system, bot responses from the transcription of the recording of the inbound call.

According to another aspect, a method for building a fingerprint database comprises receiving, by the data processing system, a transcription of a message, assigning, by the data processing system, the transcription as a candidate fingerprint based on a determination that the transcription does not match verified fingerprints from a database of verified fingerprints, determining, by the data processing system, the candidate fingerprint matches a minimum number of different candidate fingerprints from a database of candidate fingerprints, and promoting, by the data processing system, the candidate fingerprint to a verified fingerprint based on the determination that the candidate fingerprint matches the minimum number of different candidate fingerprints.

Assigning the transcription as a candidate fingerprint may further comprise storing the candidate fingerprint in the database of candidate fingerprints. In a further embodiment, the method may further comprise determining the candidate fingerprint is stored in the database of candidate fingerprints for a duration that exceeds a time limit, and purging the candidate fingerprint from the database of candidate fingerprints.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
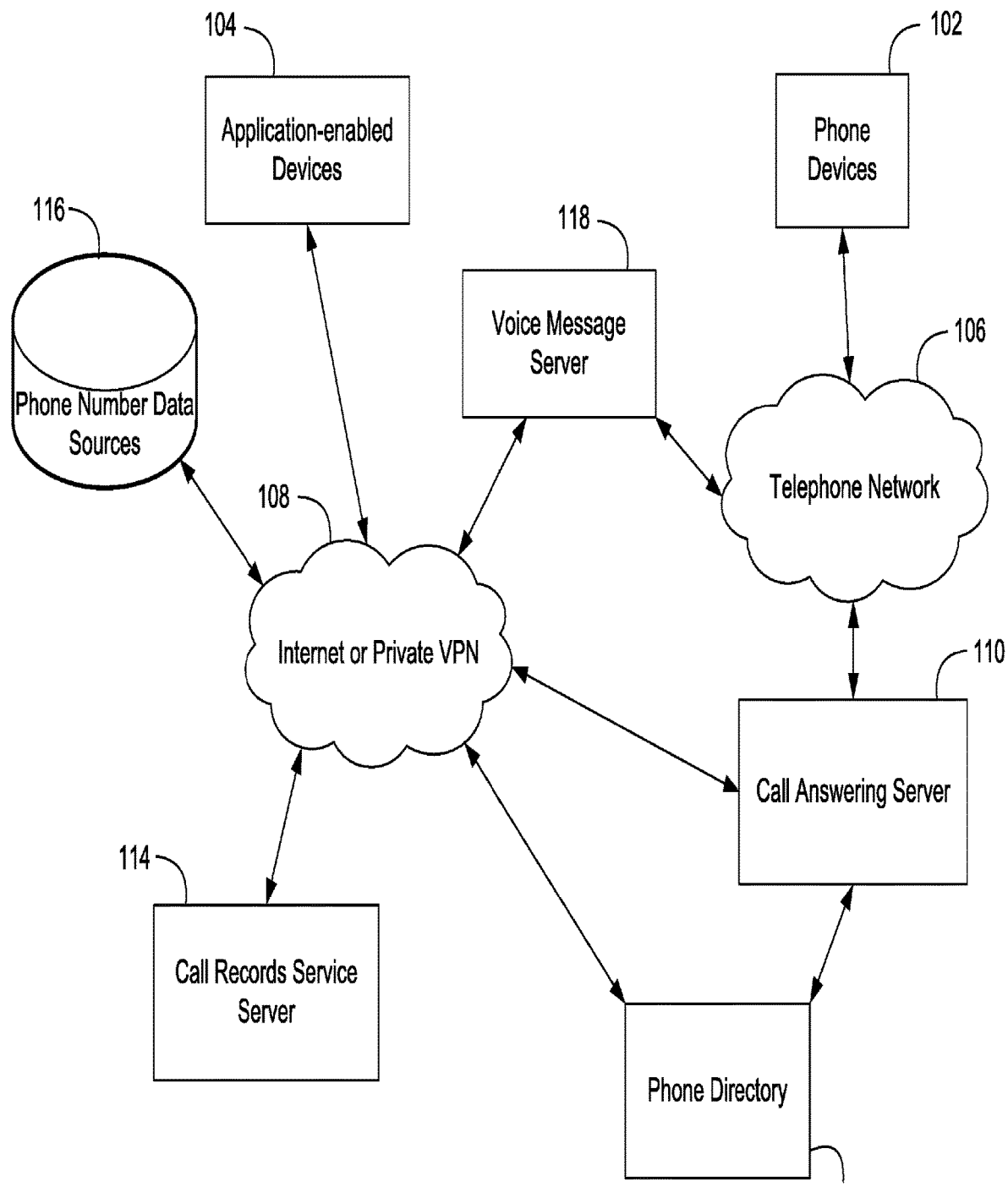
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

A collection of different data about a phone number's behavior may be used to probabilistically determine if a given phone number is likely wanted or unwanted. However, one drawback is that such a method usually requires multiple calls from a given phone number to determine whether calls from that number are problematic. During that time, call recipients are still bothered by unwanted calls and messages. Being more aggressive in probabilistically determining that a number is bad, without sufficient data points, can lead to blocking wanted calls. Techniques, such as, determining whether a phone number is a valid one (matches phone number rules and/or is an actively assigned number) often fail due to poorly programmed private branch exchanges (PBXs) or internet phone services that can generate invalid caller IDs. Additionally, it is easy to spoof numbers when making a call, meaning problematic calls can come from a generally valid number and vice versa.

Unwanted communicators often use either similar audio recordings or scripts that play when people answer their calls. Even if a communicator plays the same recording every time they call any number, it will not necessarily be captured the same way every time because the length of the inbound call audio and content can be different depending on when the automated system started playing the recording, and the voicemail transcriptions may include errors. Further, many recordings may include dynamically generated components, such as names, dates, times, and locations, such that the same recording is not played exactly the same each time. For example, given a single 100 word recorded audio to be played when a called party answers of 60 seconds, the actual captured audio could be anywhere from 1 to 60 seconds (depending on when the recording started, which depends, for example, on the number of rings, and/or how much silence if any the communicators use before playing the recording). As such, the number of words in the audio could be anywhere from 1 to 100 words, and the specific words transcribed could include any number of possible errors for each word that is captured in the audio.

Further, if the message was dynamically constructed, with names and dates and times, those items cannot be predicted in advance. For example, an unwanted Internal Revenue Service (IRS) scammer may typically leave a message such as the following: " . . . the reason you are receiving this pre-recorded message is to notify you that the IRS has issued an arrest warrant against you right now and your physical property and abode are being monitored. It's very important that I do hear back from you as soon as possible before we proceed further in any legal manner. My direct call back number is 334-600-2399. Again, the number is 334-600-2399. Thank you." However, wanted communicators often leave messages in a similar matter. For example, a hospital appointment reminder message may look like the following: "Hello this is the VA Medical Center in Fort Worth. We are calling to remind you of an appointment at the VA Medical Center in Fort Worth on Monday, August 1 at 9:00 AM for the patient born on February 17. Please follow any special instructions listed on your appointment card. If you need further assistance or wish to reschedule your appointment, please call the appropriate clinic or the Dallas VA Medical Center between the hours of 8:00 AM and 4:30 PM Monday through Friday at 214-742-8387 or 817-730-0118. Repeating, we are calling to remind you of an appointment at the VA Medical Center in Fort Worth on Monday August 1 at 9:00 AM for the patient born on February 17. Thank you for allowing us to serve you. Goodbye." Thus, it may not be possible or practical to store every single possible audio recording for comparison with inbound messages to detect unwanted calls.

The present application discloses methods, systems, and computer program products for recognizing whether a communication number, address, or unique identification (ID) corresponds to a wanted or unwanted communicator within various multi-party communication environments, such as, telephony, voice over Internet protocol (IP), text messaging, email, etc. Embodiments of the present invention are able to identify a phone number, address, or unique ID from an unwanted communicator (or a wanted communicator) based on fingerprints of prior (e.g., one or more) communication attempts. A communication attempt may include audio messages, text messages, and call recordings from a phone number, address, or unique ID. A system may be deployed to recognize when an unknown communicator's recorded behavior (e.g., a message or script) is sufficiently, but not necessarily identically, similar to other previously known recordings, which can indicate whether the unknown communicator from a particular number should be considered either unwanted or wanted. Communicator behavior may be analyzed using speech processing, recognition, and machine learning to detect messages or behaviors that are associated with either unwanted communicators, such as, telemarketers, fraudulent callers, scammers, etc., or wanted communicators, such as, from trusted communications and automated confirmations or service advisories. As such, unwanted communicators can be predictively blocked while desired communicators may be allowed to reach a call recipient successfully without impediment.

The system presented in FIG. 1 includes phone devices 102 (such as landline, cellular, analog, digital, satellite, radio, etc.), that are capable of establishing and receiving telephonic communications via a public telephone network 106, as well as application/application-enabled phone devices 104 capable of establishing and receiving telephonic communications via the Internet 108 (e.g., using VoIP). In some embodiments, the application-enabled mobile devices 104 are enabled with an application such as the one available from YouMail Inc., www.youmail.com, the assignee of the present patent application.

According to another embodiment, the system includes a private VPN (virtual private network) 108, or any other communications network. Application-enabled devices 104 may be a computing device capable of executing a telephony-related application (e.g., WiFi calling system, VoIP phone, etc.). Examples of computing devices include personal computers, television set top boxes, mobile smartphones, laptops, personal digital assistants (PDA), tablet computers, e-book readers, or any computing device having a central processing unit and memory unit capable of connecting to a communications network. The computing device may also comprise a graphical user interface (GUI) or a browser application provided on a display (e.g., monitor screen, LCD or LED display, projector, etc.). A computing device may also include or execute an application to communicate content, such as, for example, textual content, multimedia content, or the like. A computing device may also include or execute an application to perform a variety of possible tasks, such as browsing, searching, playing various forms of content, including streamed audio and video. A computing device may include or execute a variety of operating systems, including a personal computer operating system, such as a Windows, Mac OS or Linux, or a mobile operating system, such as iOS, Android, or Windows Mobile, or the like. A computing device may include or may execute a variety of possible applications, such as a computing software application enabling communication with other devices, such as communicating one or more messages, such as via email, short message service (SMS), or multimedia message service (MMS).

The system further includes a call records service server 114, a phone directory server 112, and a call answering server 110. These servers may vary widely in configuration or capabilities, but generally a server each includes one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Call records service server 114 is able to accumulate phone numbers (or addresses, or unique IDs) and information about the phone numbers from a variety of sources that can be used to determine if a given phone number is that of e.g., an unwanted communicator, or a wanted communicator. One such source is the application-enabled devices 104, which may send a list or log of calls made and received, recordings or transcriptions of phone call conversations (e.g., voicemail transcription systems, such as, one provided by the application from YouMail as mentioned above), text messages, and a list of contacts including phone numbers and associated IDs to the call records service server 114 over the VPN, Internet or other communication network 108. Other sources may include voice message server 118 and call answering server 110. Voice message server 118 and call answering server 110 may perform voice mail operations such as recording (and/or transcribing) voice messages for subscribers of phone devices 102 and application-enabled devices 104, where the recorded or transcribed voice messages can be forwarded to call records service server 114. Yet another source of information for accumulation in the call records service server 114 include publicly available phone number data sources 116, such as, telephone listings and directories, electronic yellow pages, and the like. Still other possible sources of information for populating the call records service 114 include cell phone billing records, telephone and cable service provider records such as CDRs (call detail records), and the like.

In at least one embodiment, the call records service server 114 may create one or more databases including "fingerprints" of known recordings of calls or messages (voice and/or text) from unwanted or wanted communicators by using speech processing, natural language processing, and machine learning algorithms with the information accumulated from the variety of sources. Each fingerprint may uniquely identify a sequence of characters designed to capture the content of, for example, a commonly appearing or known voice message. In another embodiment, a fingerprint may comprise a tag cloud, or alternatively, a weighted list, that includes each keyword that appears in the message and the number of times each keyword appears in the message that is used to summarize the content. A tag cloud (also known as, a word cloud or a text cloud) may comprise a representation of text content data including keywords or tags, and an emphasis of importance of each keyword or tag that may be indicated with a variety of indicators, such as, ranking, arrangement, classification, word count, font size and color.

The phone directory server 112 may receive or retrieve the phone numbers and information about the phone numbers from the call records service server 114. For each phone number, indications of likelihood that the phone number is that of an unwanted communicator may be provided by call records service server 114 to the phone directory server 112. Phone directory server 112 includes an engine that determines the likelihood that a particular number is that of an unwanted communicator based on the information about the phone numbers from records service server 114 by using the techniques described herein. For example, the indication of likelihood may be represented by a binary flag indicating whether or not the number has been determined as exceeding a threshold value set as likely to be that of an unwanted communicator. Alternatively, the likelihood may be represented with a score value computed as the likelihood of representing an unwanted communicator based on a set of quantitative rules. In another embodiment, an indication may be retrieved from the call records service server 114 that explicitly identifies a phone number as an unwanted communicator (or categorized otherwise). Phone directory server 112 may also match inbound calls or messages with the known fingerprints from records service server 114 to calculate a score that reflects a degree of overlap between the inbound calls or messages and one or more fingerprints.

The engine of phone directory server 112 may additionally use various sets of rules to help it determine the likelihood or probability of a number being that of an unwanted communicator. For example, a rule can be: if a number 'N' is a wireless number, and it has called more than 'N' times to 'Y' different users within a period of 'M' minutes, then it is very likely that the number is associated with an unwanted communicator. This rule assumes that it is impossible or highly unlikely for a person with a cell phone to dial more than a certain number of calls in a certain period of time—if a determination of more than what's achievable or reasonable in that time period, the number may be spoofed and an unwanted communicator is using it. Another exemplary rule can be: if 'N' has a non-zero score and the hashed content of a message 'N' matches the hashed content of messages from a number 'M' known to be an unwanted communicator, then 'N' is the number of an unwanted communicator. This rule is dependent on the fact that unwanted communicators tend to leave the same automated message over and over, and if a new number leaves the same message, it is likely from an unwanted communicator. Yet another rule may include determining whether a calling number is valid based on whether it belongs to a real area code or a real subset of that area code. And still another rule may include determining whether user complaint reports are available and whether the number of complaint reports exceeds a threshold or multiple of the number of explicit positive reports on a number. There can be a variety of other rules or rule equivalents and any combination thereof.

The call answering server 110 may be configured to screen or filter calls to phone devices 102 and application-enabled devices 104. Calls directed to phone devices 102 and application-enabled device 104 may be intercepted by call answering server 110 where phone directory server 112 may be queried by call answering server 110 to identify whether inbound calls to the receiving devices from specific numbers are likely to be from either unwanted communicators or wanted communicators. If call answering server 110 determines that the given number is likely to be the number of an unwanted communicator, it may play an appropriate message containing special information tones (SIT) to indicate out of service to the unwanted communicator and terminate the call. On playing the message, the call answering server 110 may combine or create messages from the carrier of the user and/or the carrier of the communicator to provide a message identical to that the carrier would play for a disconnected number. The message played by call answering server 110 need not be a generic message but can simulate an actual Telco experience. For example, if a user is a subscriber from a specific carrier, call answering server 110 may play the carrier's specific audio to an unwanted communicator. Otherwise, numbers that are determined as being unlikely from an unwanted communicator (or likely from a wanted communicator), call answering server 110 may allow the call to phone devices 102 or application-enabled devices 104 or perform voice mail operations such as playing a message that the subscriber of the receiving phone device is unavailable and the communicator may record a voice message. Alternatively, the call answering server may intercept the call from an unwanted communicator and perform any of the following: 1) report to the communicator that the person they are calling does not accept these kinds of calls, 2) report to the communicator that the person they are calling does not accept any calls, and 3) hung up on the communicator and/or optionally play a disconnected message.

Figure 2:
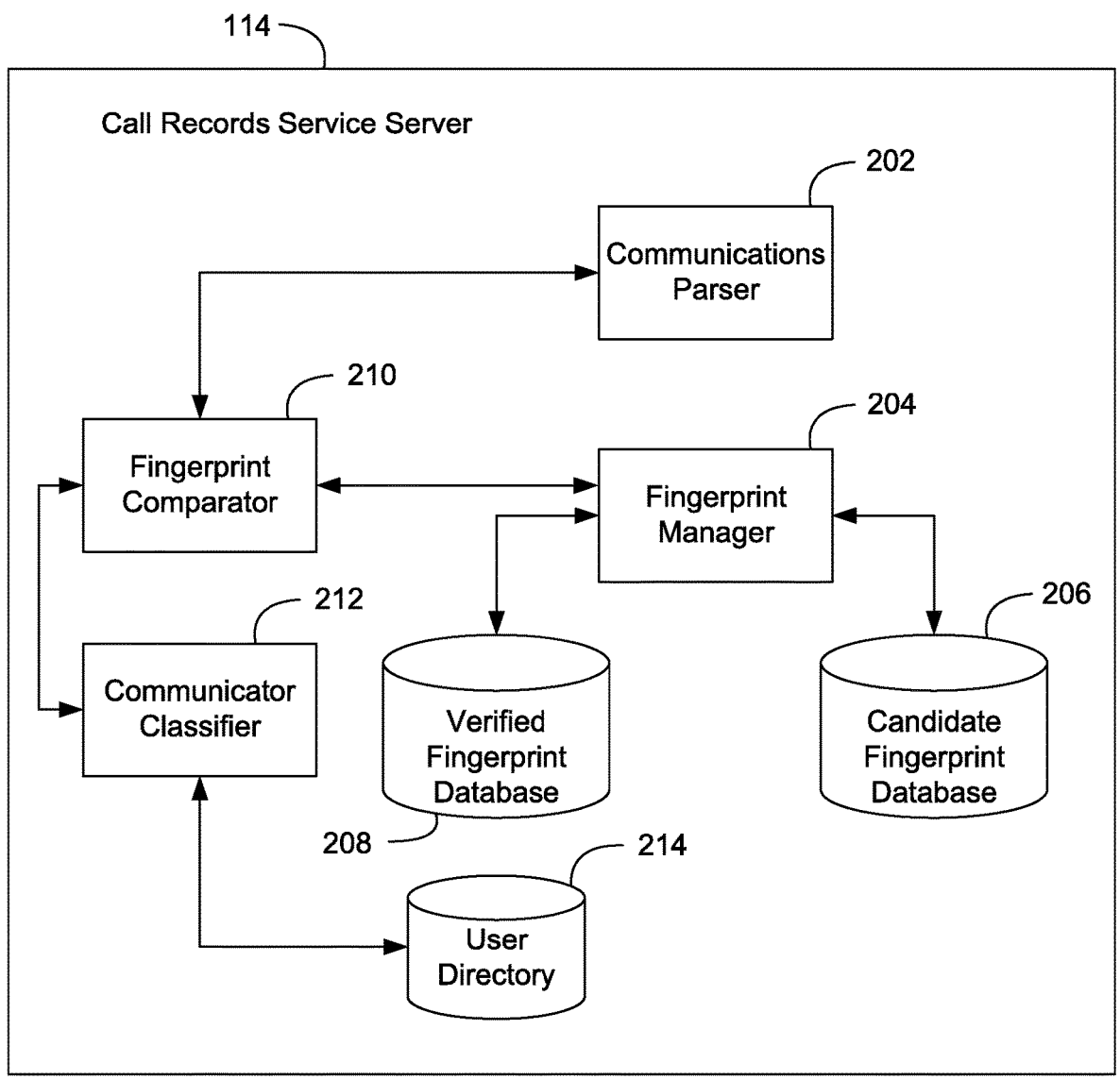
FIG. 2 illustrates a call records service server according to an embodiment of the present invention.

FIG. 2 presents a call records service server according to an embodiment of the present invention. Call records service server 114 includes communications parser 202, fingerprint manager 204, candidate fingerprint database 206, candidate fingerprint database 208, fingerprint comparator 210, communicator classifier 212, and user directory 214. Communications parser 202 is operable to receive inbound communications, such as, calls, text messages, voicemail messages, emails, to name a few. Additionally, communications parser 202 can turn voice messages, calls, or any other audio communications into a suitable form for analysis and matching performed by fingerprint comparator 210.

Fingerprints may be created, deleted, and edited in candidate fingerprint database 206 and verified fingerprint database 208 by fingerprint manager 204 based on matching or analysis by fingerprint comparator 210. For example, the inbound communications may be compared by fingerprint comparator 210 with fingerprints in candidate fingerprint database 206 and verified fingerprint database 208 to create fingerprints from the inbound communications, which is described in further detail with respect to the description of FIG. 5. Candidate fingerprint database 206 and verified fingerprint database 208 may include fingerprints of known recordings of inbound messages from unwanted or wanted communicators by using speech processing, natural language processing, and machine learning algorithms with the information accumulated from the variety of sources.

Communicator classifier 212 may be used to compare a given inbound message from an unknown communicator with stored fingerprints in verified fingerprint database 208 to identify whether and how likely the unknown communicator of the given inbound message is wanted or unwanted based on the at least one match to a fingerprint. The communicator classifier 212 may extract features from the given inbound message and compare (similarities and/or differences) them with corresponding features in the stored fingerprints. A statistical probability that the unknown communicator is either an unwanted caller or a wanted caller may be calculated based on the comparison. Additionally, communicator classifier 212 may determine the likely identity of the unknown communicator (e.g., a wanted communicator and likely from a local pharmacy). The communicator classifier 212 may direct fingerprint comparator 210 to parse the given inbound message from communications parser 202. The fingerprint comparator 210 may then compare the parsed inbound message to one or more verified fingerprints from verified fingerprint database 208 to determine one or more matches. Verified fingerprint database 208 may include fingerprints of messages from known unwanted communicators, wanted communicators, or a combination of both. Based on the comparison and matching of the inbound message to one or more verified fingerprints, the communicator classifier 212 can determine if the unknown communicator of the given inbound message is likely to be an unwanted communicator or a wanted communicator. That is, if the given inbound message matches a fingerprint of a message of a known unwanted communicator, the communicator of the given inbound message may also be likely to be an unwanted communicator. The communicator classifier 212 may also collect phone numbers (or addresses, or unique identifications (IDs)) and information about the phone numbers from a variety of sources that can be used to determine if a given phone number, address, or ID is that of e.g., an unwanted communicator, or a wanted communicator. Unwanted communicators and wanted communicators determined by communicator classifier 212 may be stored in and retrieved from user directory 214.

Figure 3:
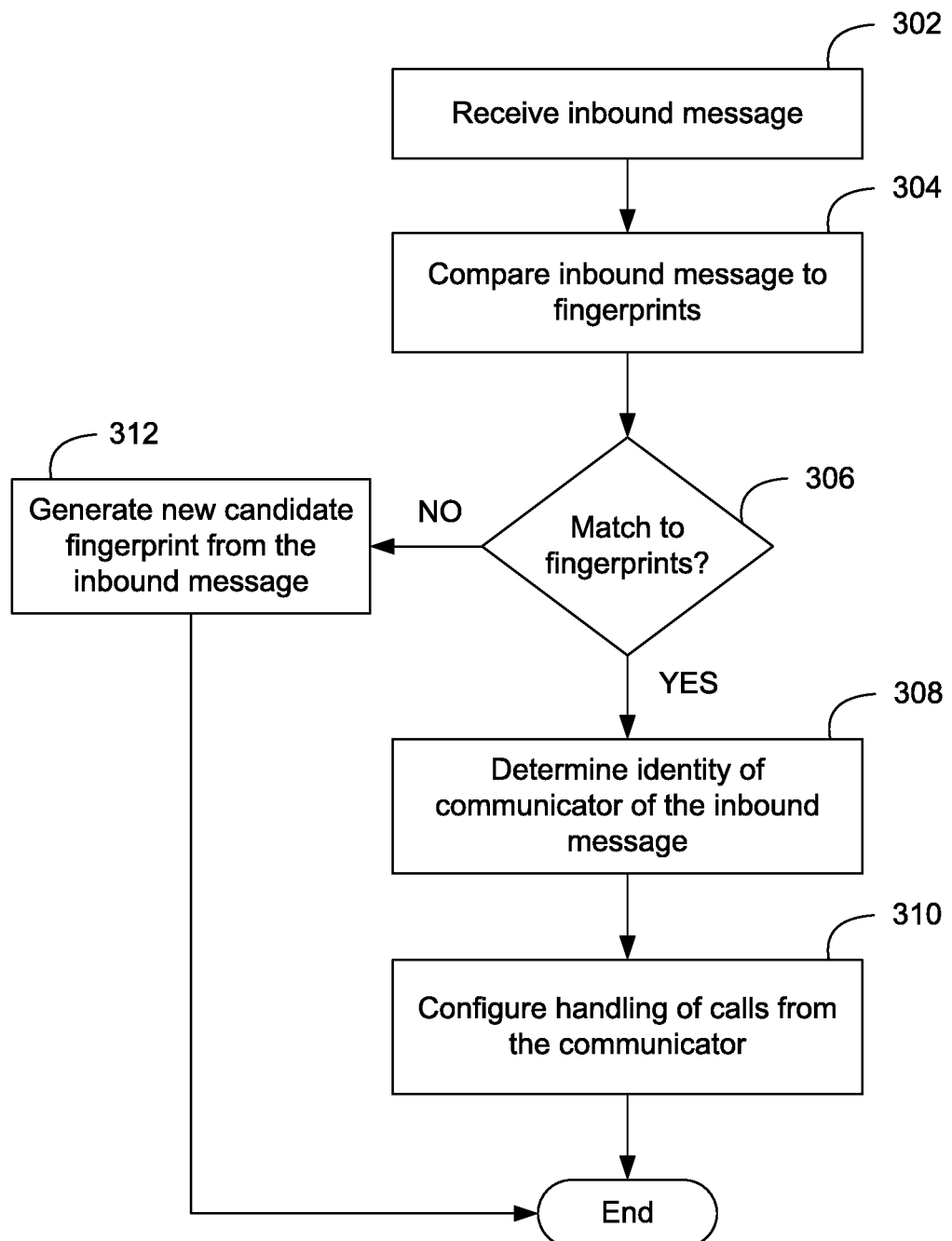
FIG. 3 illustrates a flowchart of a method for identifying wanted or unwanted messages according to an embodiment of the present invention.

FIG. 3 presents a flowchart of a method for identifying unwanted messages according to an embodiment of the present invention. An inbound message is received from a communicator, step 302. The inbound messages may be either short message service (SMS) text or voice messages that are directed to an intended recipient from a communicator. The communicator may be either unwanted, wanted, or may have an unknown phone number, address, or otherwise unique ID. Inbound messages may be voice messages that are transcribed and turned into a form suitable for analysis and matching (e.g., text) using machine learning along with speech recognition and processing techniques. Exemplary methods and algorithms that may be used include Hidden Markov models, neural networks, deep learning, and end-to-end automatic speech recognition, to name a few. A suitable form may include a string of characters, or alternatively, a tag cloud.

The inbound message is compared to fingerprints from a database, step 304. The inbound message may be examined by contacting, for example, a phone directory server to determine whether the inbound message is from an unwanted communicator or a wanted communicator. The phone directory server may include or is communicatively coupled to a database of fingerprints that are created from known recordings of calls or messages from unwanted or wanted communicators. The known recordings of calls or messages may be collected from a plurality of sources such as, voice message servers, call forwarding servers, telco and communication service carriers. The fingerprints may be used for comparison with inbound calls and messages to distinguish unwanted messages from wanted messages as well as identifying a likely identity associated with the communicator of the inbound message. Identifying a likely identity may include determining a probability that a communicator is wanted or unwanted based on determined similarities between the inbound message and the fingerprints. For example, the communicator of the inbound message may be identified as an unwanted caller if the inbound message is statistically similar (e.g., a 70% match) to one or more fingerprints associated with known unwanted callers. Alternatively, communicator of the inbound message may be identified as an unwanted caller if a number of statistical matches between the inbound message and fingerprints associated with known unwanted callers exceeds a particular threshold.

A given fingerprint may comprise features associated with a given message from a phone number of an unwanted communicator. The features may include a phone number, message duration, call frequency, time of call, call recipients, keywords, phrases, speech tone and other speech characteristics (such as, audio characteristics to help ensure matches—e.g., frequency range, whether it's male/female voice). Features of the given fingerprint may be compared to corresponding features extracted from the inbound message. An aggregated score may be calculated based on a comparison of each feature. For example, certain features may be weighted more highly than others in calculating the aggregated score.

Each fingerprint can be associated with a tag based on whether its content indicates a problematic or safe communicator. An optional identifier including a descriptive or precise name may be associated with a communicator of the fingerprint (e.g., IRS Scam) to identify the communicator when calling. An algorithmic, rules-based approach may be used to determine whether or not a given fingerprint could indicate an unwanted call and what the likely name should be to identify the communicator. For example, the content of the data in the fingerprint may be analyzed, including phone numbers and keywords that appear in the fingerprint using rules such as, if a fingerprint contains a phone number, ID, or address known to be an unwanted communicator (as in the IRS Scam example above), the fingerprint can be tagged as unwanted and use the same name as other fingerprints also containing that phone number, ID, or address. An opposite rule may also be used if the fingerprint contains a known good number to call back, and it can be assumed to be a wanted call. Adding new fingerprints to a fingerprint database may include soliciting feedback from, for example, a human curator to review the information associated with the fingerprint.

The inbound message may be compared against the known fingerprints of messages using methods and algorithms such as, logistic regression, decision trees, Bayesian network, and clustering to determine how much overlap there is between a given fingerprint and the inbound voice message, and to calculate a matching score. In one embodiment, the comparison can be based on computing longest matching sequences. In another embodiment, the comparison may be based on comparing tag clouds of the known recordings and the inbound message, and finding a tag cloud from the known recordings with the "best fit." A match of inbound messages with the known fingerprints may be determined based on a score that reflects a degree of overlap between an inbound message and a given fingerprint. A score that is equal to or exceeds a minimum score may indicate a match. The minimum score may be determined using techniques such as machine learning that is trained with a sample set of messages. Any of the above algorithms used in the comparison may also determine a highest matching score over a minimum acceptable score. Alternatively, a match of inbound messages with known fingerprints may be determined based on a score that reflects the degree of difference between an inbound message and a given fingerprint.

A determination is made whether the inbound message matches any of the fingerprints, step 306. If the inbound message does not match any fingerprint, a new candidate fingerprint may be generated from the inbound message, step 312. Otherwise, an identity of the communicator of the inbound message is determined based on a match to any of the fingerprints, step 308. Determining the identity of the communicator may comprise determining a likelihood that the communicator is wanted or unwanted based on matching (either a degree of overlap or differences) of the inbound message to any of the fingerprints, and classifying the communicator as either an unwanted communicator if the inbound message matches (to a certain degree) one or more fingerprints associated with unwanted communicators, or a wanted communicator if the inbound message matches (to a certain degree) one or more fingerprints associated with wanted communicators.

Handling of calls from the communicator is configured based on the identity of the communicator, step 310. Users may be provided with the option to automatically reject and dispose of future communications from unwanted communicators should their telephone or application-enabled device receive a call or message from an unsolicited communicator. For example, if the communicator of the inbound message is determined to be an unwanted communicator (from step 308), out-of-service operations may be configured for the phone number, address, or unique ID associated with the inbound message. Out-of-service operations may include playing a sequence of tones to the communicator followed by a "disconnected message" that emulates the behavior of a phone number that is not in service. Alternatively, unwanted communicators may be added to a black list where future calls or messages from phone numbers, addresses, or unique IDs from unwanted communicators are blocked. Additionally, users can configure their devices to not ring or display the inbound call when they are determined to be unwanted, thus effectively eliminating any personal distraction that may have otherwise experienced upon receiving a call from an unwanted communicator. Calls from phone numbers, addresses, or unique IDs of wanted communicators may be configured (e.g., placed on a white list) for unimpeded calling to a user's device or normal voice mail operations that allows a communicator to leave a message and access normal answering service operations. This allows unwanted communicators to be blocked in the future, and desired communicators to always get through successfully.

The phone number, address, or unique ID of the communicator may also be identified for future calls (such as in a call log that identifies blocked calls) to other recipients as well as the intended recipient of the inbound message. That is, a match of an inbound call to a type of fingerprint (unwanted vs. wanted) may be used to play an appropriate message (such as an out of service message for unwanted communicators) to communicators from the phone number, address, or unique ID, and an identifier (e.g., IRS Scam) may be used to provide an appropriate communicator ID (such as "IRS Scam"), which can be displayed in call logs and other places, even when the call has been blocked.

Figure 4:
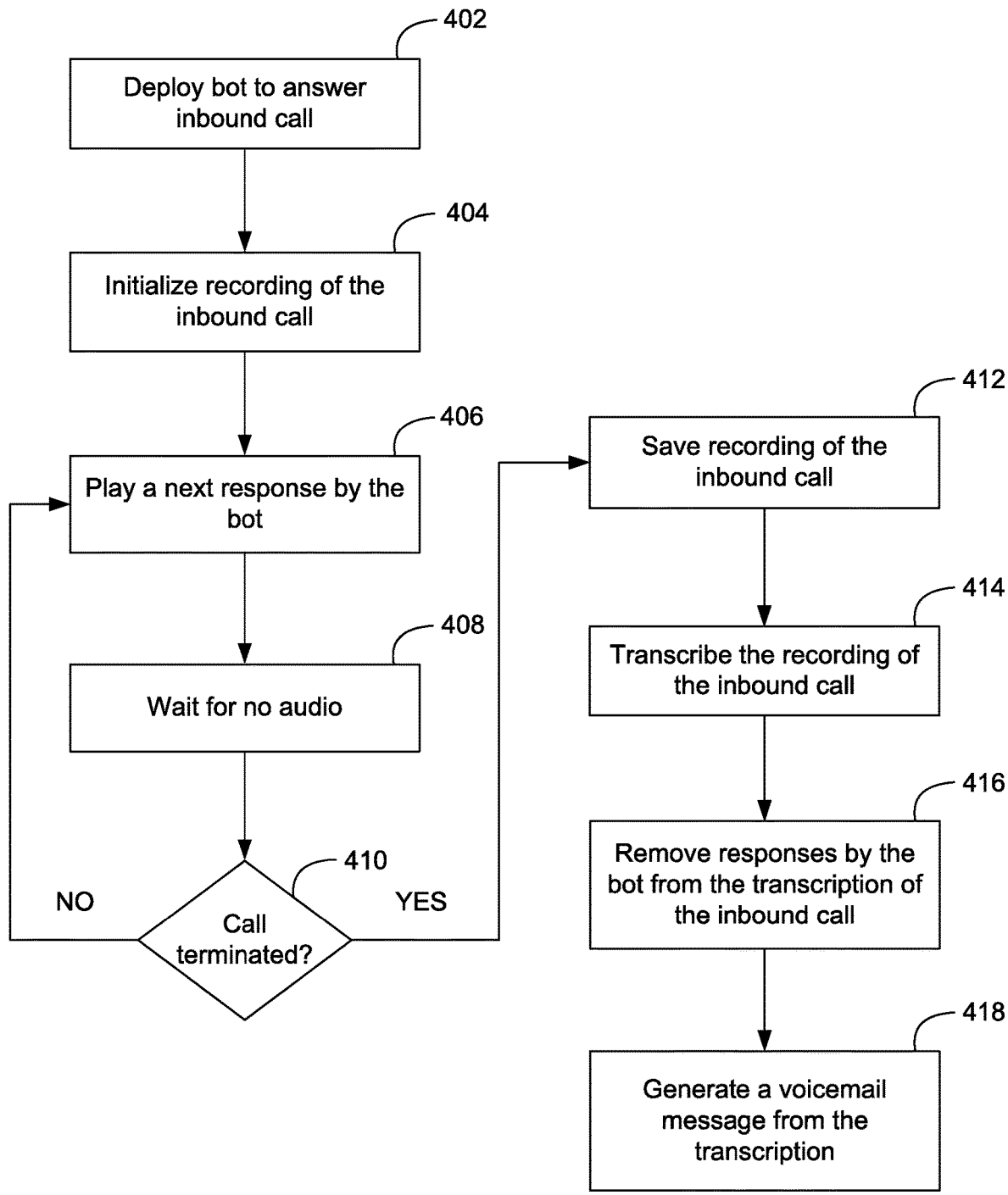
FIG. 4 illustrates a flowchart of a method for identifying wanted or unwanted calls according to an embodiment of the present invention.

FIG. 4 presents a flowchart of a method for identifying unwanted calls according to an embodiment of the present invention. Unwanted communicators are not limited to automatically generated messages, but may also include auto-dialers combined with a connection to a call center person working from a script. To address this, a call answering bot may be used to record and transcribe calls between the call answering bot and unwanted communicators. A call answering bot may comprise a chatbot (also known as a talkbot, chatterbot, chatterbox, instant messenger (IM) bot, interactive agent, or artificial conversational entity) that includes computer program instructions and/or artificial intelligence capable of conducting a conversation with a communicator via auditory methods. The call answering bot may be configured to convincingly simulate how a human would behave as a conversational partner.

A bot is deployed to answer an inbound call from a communicator, step 402. The bot may answer inbound calls from a given set of "honeypot" phone numbers. That is, the given set of honeypot phone numbers may be a predetermined list of phone numbers from known unwanted and/or wanted communicators. The bot may be allowed to interact with the communicator in place of an actual human. A recording of the inbound call between the communicator and the bot is initialized, step 404. The recording may capture audio content or speech of the bot interacting with the communicator for the entirety of the inbound call.

A next response from a sequence of responses is played by the bot, step 406. In one embodiment, the bot may be constructed as a sequence of known responses (e.g., "hello", "yes, go on," "can you repeat that?", and so on). When there is an inbound call, the bot can play a next response from the sequence of known responses. The bot waits until there is no audio from the communicator, step 408. When the audio stops, a determination is made whether the inbound call has been terminated, step 410. If the call has not been terminated, then the next response is played by the bot, step 406 and continues until the call is terminated.

When the call is terminated, the recording of the inbound call between the communicator and the bot is saved, step 412. The recording of the inbound call between the communicator and the bot is transcribed, step 414. The responses played by the bot may be identified and removed from the transcription of the recording of the inbound call, leaving a transcription of what the communicator said during the inbound call, step 416. A voice message is generated from the transcription of the recording of the inbound call, step 418. The recording of what the communicator said may be treated as a voice message and the method depicted in FIG. 3 may be further applied.

Figure 5:
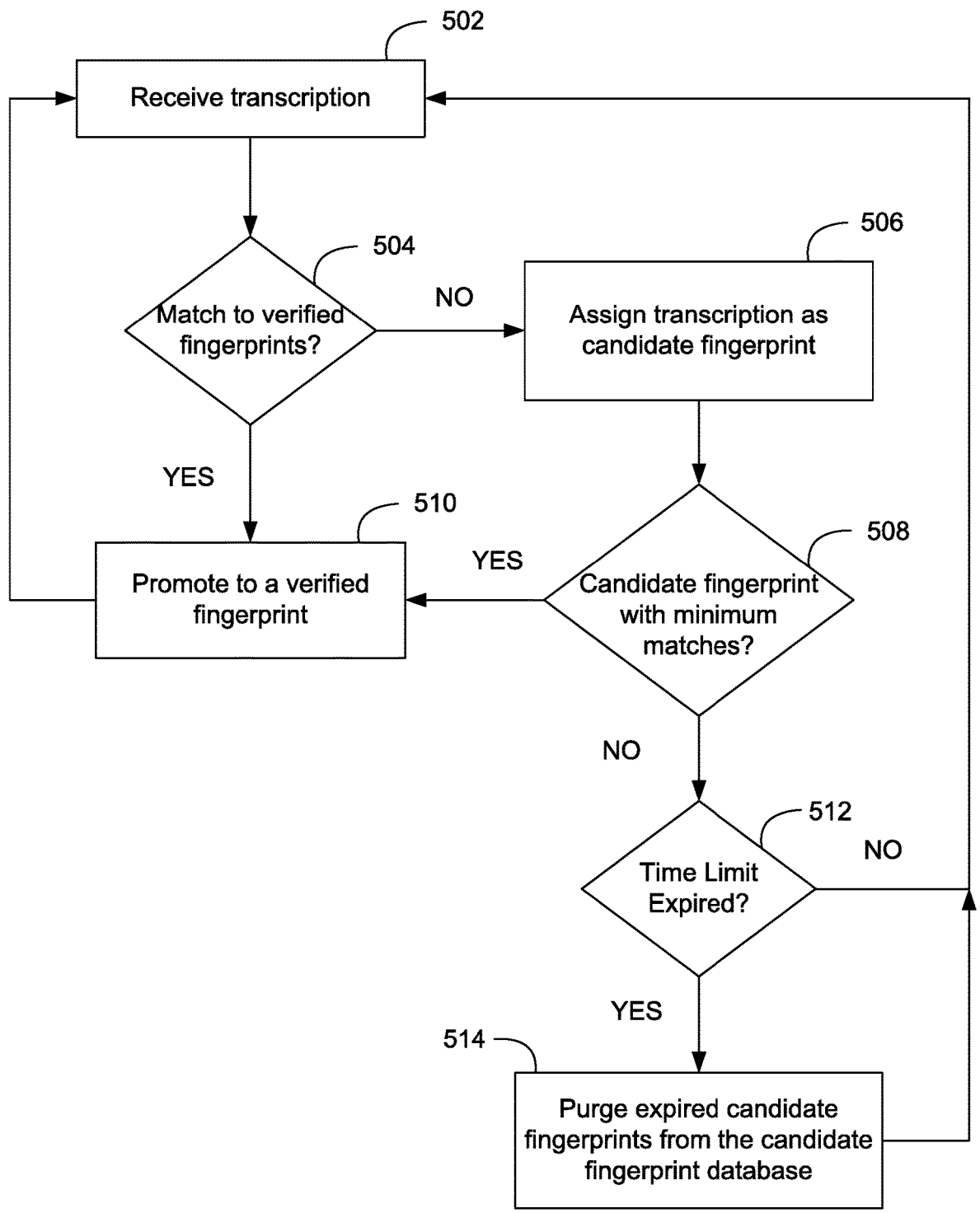
FIG. 5 illustrates a flowchart of a method for building a fingerprint database according to an embodiment of the present invention.

FIG. 5 presents a flowchart of a method for building a fingerprint database according to an embodiment of the present invention. Building a fingerprint database may include maintaining a database of "verified fingerprints" and a database of "candidate fingerprints." The database of fingerprints may be developed by promoting candidate fingerprints to verified fingerprints. Voice messages, text messages, or calls may be processed to create fingerprints. A transcription of a message or call is received, step 502. The transcription may belong in either the database of verified fingerprints or the database of candidate fingerprints based on whether the transcription matches any of the verified fingerprints from the database of verified fingerprints.

The transcription may be compared to verified fingerprints from the database of verified fingerprints to determine whether the transcription matches any of the verified fingerprints from the database of verified fingerprints, step 504. If the transcription matches at least one of the verified fingerprints from the database of verified fingerprints, the transcription is promoted to a verified fingerprint, step 510. If the transcription does not match any of the verified fingerprints from the database of verified fingerprints, then the transcription is assigned as a candidate fingerprint, step 506. Assigning the transcription as a candidate fingerprint may include converting the transcription into a candidate fingerprint and storing the candidate fingerprint in the database of candidate fingerprints.

A determination is made whether the candidate fingerprint matches a minimum number of other candidate fingerprints from the database of candidate fingerprints, step 508. Matching the candidate fingerprint to other and different candidate fingerprints from the database of candidate fingerprints may be performed by using the same matching techniques as disclosed above. Additionally, user feedback, such as a report that a message is a spam message or a safe message, can be used to restrict the set of other candidate fingerprints to match with the candidate fingerprint. If the candidate fingerprint matches the minimum number of other candidate fingerprints from the candidate database, the candidate fingerprint is promoted automatically (or after a human curation process) to a verified fingerprint, step 510. As such, a verified fingerprint may capture a number of specific "matching" inbound messages or calls, allowing for significant variation in the specific messages or calls captured by a fingerprint. Promoting the candidate fingerprint may include transferring the candidate fingerprint from the database of candidate fingerprints to the database of verified fingerprints. Candidate fingerprints may be stored in the database of candidate fingerprints until a time limit expires, step 512. Candidate fingerprints that are not promoted within a particular time frame (before the time limit expires in step 512) become expired candidate fingerprints and are purged from the database of candidate fingerprints, step 514.

FIGS. 1 through 5 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random-access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method, in a communication environment including a data processing system comprising a processor and a memory, for identifying communicators as wanted or unwanted based on messages from such communicators, the method comprising:

recording, by the data processing system, communications from a plurality of communicators;
generating, by the data processing system, fingerprints of message content from the recording of the communications;
tagging, by the data processing system, the fingerprints with data representative of whether the message content is associated with one or more unwanted communicators;
determining, by the data processing system, given ones of the fingerprints are associated with one or more unwanted communicators based on the tagging;
matching, by the data processing system, at least one of the given fingerprints to an inbound communication from an unknown communicator;
determining, by the data processing system, an identity of the unknown communicator as being likely unwanted based on the tagged data of the matched at least one of the given fingerprints; and
automatically rejecting or disposing of communications from the unknown communicator determined to be likely unwanted.

2. The method of claim 1 wherein the communications include at least one of calls, voice messages, text messages, and emails.

3. The method of claim 1 further comprising electronically deploying computer-generated auditory speech to facilitate the communications with the plurality of communicators.

4. The method of claim 1 wherein determining the identity of the unknown communicator further comprises identifying the unknown communicator as either an unwanted communicator or a wanted communicator.

5. The method of claim 1 further comprising identifying, by the data processing system, that the inbound communication matches fingerprints of at least one known unwanted or wanted communicator.

6. The method of claim 1 further comprising creating, by the data processing system, a database of the fingerprints from known recordings of calls or messages from unwanted or wanted communicators.

7. The method of claim 1 wherein the message content used to generate the fingerprints includes content selected from the group consisting of: textual content, multimedia content, phone number, message duration, time of call, call recipients, keywords, and phrases.

8. The method of claim 1 further comprising intercepting the unknown communicator based on the determined identity.

9. The method of claim 1 further comprising associating descriptive identifiers to the plurality of communicators.

10. The method of claim 1 further comprising:
transcribing the communications; and
comparing the transcribed communications to verified fingerprints.

11. The method of claim 10 further comprising:
converting a given one of the transcribed communications into candidate fingerprints; and
promoting the candidate fingerprints to verified fingerprints based on a match to a given number of other candidate fingerprints.

12. A system for identifying communicators in a communication environment as wanted or unwanted based on messages from such communicators, the system comprising:
a processor; and
a memory having executable instructions stored thereon that when executed by the processor cause the processor to:
record communications from a plurality of communicators;
generate fingerprints of message content from the recording of the communications;
tag the fingerprints with data representative of whether the message content is associated with one or more unwanted communicators;
determine given ones of the fingerprints are associated with one or more unwanted communicators based on the tagging;
match at least one of the given fingerprints to an inbound communication from an unknown communicator;
determine an identity of the unknown communicator as being likely unwanted based on the tagged data of the matched at least one of the given fingerprints; and
automatically reject or dispose of communications from the unknown communicator determined to be likely unwanted.

13. The system of claim 12 wherein the communications include at least one of calls, voice messages, text messages, and emails.

14. The system of claim 12 wherein the processor is further configured to deploy computer-generated auditory speech to facilitate the communications with the plurality of communicators.

15. The system of claim 12 wherein the processor is further configured to identify the unknown communicator as either an unwanted communicator or a wanted communicator.

16. The system of claim 12 wherein the processor is further configured to identify that the inbound communication matches fingerprints of at least one known unwanted or wanted communicator.

17. The system of claim 12 wherein the processor is further configured to create a database of the fingerprints from known recordings of calls or messages from unwanted or wanted communicators.

18. The system of claim 12 wherein the message content used to generate the fingerprints includes content selected from the group consisting of: textual content, multimedia content, phone number, message duration, time of call, call recipients, keywords, and phrases.

19. The system of claim 12 wherein the processor is further configured to intercept the unknown communicator based on the determined identity.

20. Non-transitory computer-readable media comprising program code that when executed by a programmable processor causes execution of a method for identifying communicators in a communication environment as wanted or unwanted based on messages from such communicators, the computer-readable media comprising:
computer program code for recording communications from a plurality of communicators;
computer program code for generating fingerprints of message content from the recording of the communications;
computer program code for tagging the fingerprints with data representative of whether the message content is associated with one or more unwanted communicators;
computer program code for determining given ones of the fingerprints are associated with one or more unwanted communicators based on the tagging;

computer program code for matching the given fingerprints to an inbound communication from an unknown communicator; and computer program code for determining an identity of the unknown communicator as being likely unwanted based on the tagged data of the matched at least one of the given fingerprints; and computer program code for automatically rejecting or disposing of communications from the unknown communicator determined to be likely unwanted.

* * * * *